United States Patent [19]

Goodman

[11] Patent Number: 5,051,034
[45] Date of Patent: Sep. 24, 1991

[54] MAGNETICALLY DETECTABLE PLASTIC PIPE

[75] Inventor: William L. Goodman, Mountain View, Calif.

[73] Assignee: Gas Research Institute

[21] Appl. No.: 452,195

[22] Filed: Dec. 18, 1989

[51] Int. Cl.⁵ .......................... F16L 1/00; F16L 57/00
[52] U.S. Cl. .................... 405/157; 138/104; 264/108; 405/154
[58] Field of Search ............... 405/154, 157; 264/105, 264/108, 173, 209.1; 138/104

[56] References Cited

U.S. PATENT DOCUMENTS

| | | | |
|---|---|---|---|
| 3,367,370 | 2/1968 | Sherlock | 138/104 |
| 3,504,503 | 4/1970 | Allen | 405/157 |
| 3,568,626 | 3/1971 | Southworth | 405/157 X |
| 3,633,533 | 1/1972 | Allen | 405/157 X |
| 3,732,617 | 5/1973 | Rowe et al. | 264/108 X |
| 3,918,867 | 11/1975 | Beyer | 264/108 X |
| 4,003,408 | 1/1977 | Turner | 405/45 X |
| 4,449,098 | 5/1984 | Nakamura et al. | 405/157 X |
| 4,500,595 | 2/1985 | Gerteisen et al. | 264/108 X |
| 4,517,316 | 5/1985 | Mason | 405/45 X |
| 4,767,237 | 8/1988 | Cosman et al. | 405/157 |

*Primary Examiner*—Dennis L. Taylor
*Attorney, Agent, or Firm*—Neal J. Mosely

[57] ABSTRACT

A magnetically detectable plastic, e.g., polyethylene, polyvinyl, etc., pipe for underground use comprises a hollow tubular plastic pipe having particles of magnetic material embedded in plastic and secured integrally with the wall of the pipe. The magnetic particles are of iron oxide or barium ferrite and of a size, shape, distribution and proportion such that the plastic pipe may be easily detected by magnetic detection apparatus on the surface when the plastic pipe is buried at a selected depth under the ground. The magnetic particles are uniformly distributed throughout the thickness and uniformly distributed around the entire circumference of the plastic pipe or the magnetic particles may be distributed in discrete portions of the plastic pipe, as for example, a uniform outer layer of the pipe or in stripes or strips extending along the pipe. The particles may be extruded with the plastic in forming the pipe, whether uniformly dispersed or in discrete regions or the pipe may be formed of plastic free of the magnetic particles and the magnetic particles provided in a separately applied strip which may be coextruded or fused or adhered to the wall of the pipe. The magnetic strips or magnetic portions of the plastic pipe may have selective areas or portions magnetized to encode information readable from the surface of the ground above the buried pipe or in inventorying pipe on the surface.

19 Claims, 2 Drawing Sheets

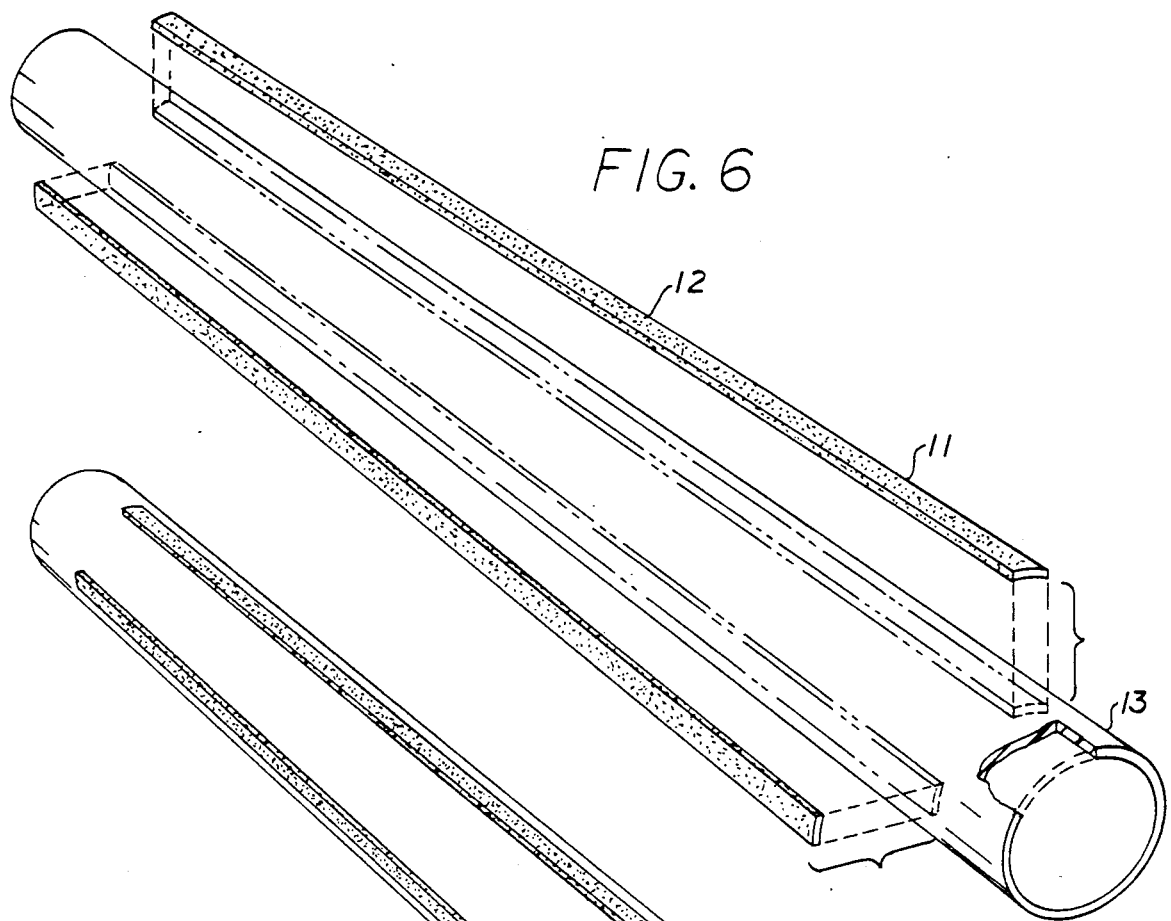
FIG. 6
FIG. 7
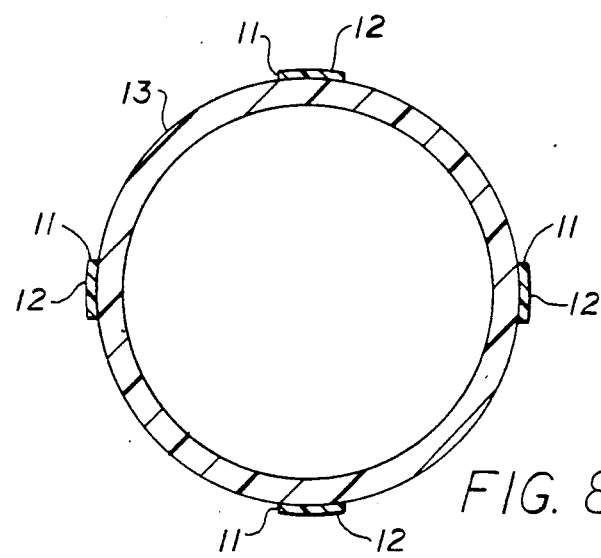
FIG. 8

MAGNETICALLY DETECTABLE PLASTIC PIPE

BACKGROUND OF THE INVENTION

1. Field of the Invention

This invention relates generally to facilitating the detection of pipes intended for deployment below ground, so that they may readily be located, and relates more particularly to the development of a means and material for the magnetic detection of plastic pipe.

2. Brief Description of the Prior Art

In many situations it is desirable to locate pipes below the surface of the earth, either to service or repair them or to avoid inadvertent damage when subsequently excavating in the vicinity. Much of the pipe used in construction today, particularly for natural gas lines, is plastic rather than metal.

Plastic pipe is typically polyethylene, but may also be other formulations such as polyvinylchloride (PVC). Plastic pipe has several advantages. It is extremely durable and reliable, relatively lightweight, easy to make, and cheaper than most other materials that may be used. Perhaps most importantly, it essentially inert, such that nothing sent through it will react with it, unlike some other materials.

One problem in using plastic pipe, however, is that once buried it is difficult to find, thus making it difficult to service the pipe and more likely that unintentional damage will result from nearby digging.

Various attempts have been made to solve this problem. Ribbons have been buried above the pipes, so that one could in theory locate the pipe by digging until the ribbon, of a color contrasting to the soil, was found. See, e.g., Allen, U.S. Pat. No. 3,115,861, and Prosser, U.S. Pat. No. 3,282,057. However, since two separate items must be buried, it is difficult to locate the ribbon accurately over the pipe, and the ribbon may "drift" away from the pipe after it is buried, thus making it more difficult to locate the pipe even if the ribbon is found. Also, the ribbon must later be located by digging as there is no way to detect it from above ground. Finally the ribbons may break or get lost in the soil being excavated, particularly where substantial digging is done, such as by heavy equipment, and may thus be lost before they can be located.

Similarly, metal foils have also been buried above pipes, as in Allen, U.S. Pat. No. 3,504,403, and Allen et al., U.S. Pat. No. 3,633,533, the alleged advantage being that these may be detectable from the surface by a metal detector device. Again, however, the problems of accurate placement of the ribbon over the pipe and the possible drift render this solution unsatisfactory.

A variation on this theme is shown in Southworth et al., U.S. Pat. No. 3,568,626, which describes reinforcing a metal foil with some other material, such as nylon, fiberglass or steel, so that the foil is not easily broken, and using shorter portions or stretchable portions so that an equipment operator will hopefully see a portion uncovered by the excavation before the pipe is damaged. The metal foil may contain either magnetic or radioactive material so that once that part of the foil is located by digging, the remainder can be followed from above ground by an appropriate detector. Again, however, the foil must be buried over the pipe, and problems of drift and breakage remain. As with colored ribbons, it is possible that the operator will not see the foil before striking the pipe.

Keene, U.S. Pat. No. 4,573,829 involves a somewhat similar concept, in which a wire is placed inside the pipe. The wire can be detected either by a magnetometer, or if the wire is magnetic, or by applying an R.F. signal to the wire and locating it with an R.F. sensing device. However, just as the ribbons described above require an extra step to bury, an extra step is required here to insert the wire into the pipe during construction of the pipeline. Also, if it is desirable to apply the R.F. signal to the wire, the ends must be located to do so. Finally, it is possible that the wire may break, thus preventing detection by R.F. methods, since an open circuit would result and no signal could be applied in such a case.

There have been other efforts to mark the location of an underground pipe, such as placing markers in the ground or inscribed in the pavement near the location of the pipe. These are generally not accurate enough to solve the problem, and much time can be wasted in locating the pipe even when there is a marker in the general vicinity.

It is felt that none of these methods solve the problem of allowing for a plastic pipe to be buried in a single step, without additional inconvenience or having to bury an additional object, while permitting detection from above ground after burial by ordinary means and without locating a buried ribbon or foil or the ends of a wire.

SUMMARY OF THE INVENTION

One of the objects of this invention is to provide a magnetically detectable plastic pipe whose position can be easily detected from the surface when buried in the ground.

Another object of this invention is to provide a magnetically detectable plastic pipe wherein magnetic particles are distributed in the wall of the pipe so that it is easily detected from the surface when buried in the ground.

Another object of this invention is to provide a magnetically detectable plastic pipe wherein magnetic particles are distributed in the wall of the pipe by extrusion with the plastic at the time the pipe is formed so that it is easily detected from the surface when buried in the ground.

Still another object of this invention is to provide a magnetically detectable plastic pipe wherein magnetic particles are distributed in discrete regions of the wall of the pipe so that it is easily detected from the surface when buried in the ground.

Still another object of this invention is to provide a magnetically detectable plastic pipe wherein magnetic particles are distributed in strips or stripes extending along the wall of the pipe so that it is easily detected from the surface when buried in the ground.

Yet another object of this invention is to provide a magnetically detectable plastic pipe wherein magnetic particles are distributed in strips or stripes extending along the wall of the pipe so that it is easily detected from the surface when buried in the ground, the stripes or stripes being coextruded with the pipe at the time the pipe is formed or extruded separately from the pipe and joined to the pipe by adhesive or by being fused to the wall of the pipe.

Yet another object of this invention is to provide a magnetically detectable plastic pipe wherein magnetic particles are distributed in or on the wall of the pipe and selected areas or portions magnetized to encode data that it is easily detected and read from a distance.

Other objects of the invention will become apparent from time to time throughout the specification and claims as hereinafter related.

The present invention provides several methods of rendering plastic pipe magnetically detectable, all of which involve mixing magnetic material with polyethylene or other suitable carriers. One embodiment comprises the steps of selecting magnetic materials suitable due to their shape as well as strength of magnetic remanence and cost, formulating a mixture of unformed plastic and magnetic material and mixing the materials, extruding said mixture into various sizes of plastic pipe. Alternatively, the concentration of magnetic material may be significantly increased, and strips of highly magnetic plastic or other materials may either 1) be coextruded with the plastic pipe, or 2) formed or extruded alone and later joined to the pipe by heating both pipe and strip or by application of adhesives.

This invention has several advantages. Since the pipe itself, in one of the above ways, contains the magnetic signal, the person or persons installing the pipe need only bury the pipe, and not any other ribbons, wires or foils. Nor do any wires need to be inserted into the pipe during the installation. No special care is required, either, in the joining of sections of pipe. Once buried, there are no problems with the materials containing the locating (magnetic) signal drifting with respect to the location of the pipe. The pipe is thus detectable from above ground by normal magnetometers, and thus there is no need to locate a ribbon or foil during excavation, or to locate a wire to apply an R.F. signal.

BRIEF DESCRIPTION OF THE DRAWINGS

FIG. 6 is an exploded, isometric view of a plastic pipe with magnetic material in plastic strips positioned for assembly on the pipe in accordance with one embodiment of this invention.

FIG. 7 is an isometric view of a plastic pipe with magnetic material, in plastic strips secured on the pipe in accordance with one embodiment of this invention.

FIG. 8 is a cross section taken on the line 8—8 of FIG. 7.

DESCRIPTION OF THE PREFERRED EMBODIMENTS

This invention comprises a magnetically detectable plastic, e.g., polyethylene, polyvinyl, etc., pipe for underground use which comprises a hollow tubular plastic pipe having particles of magnetic, preferably needle-like particles or platelets of iron oxide or barium ferrite, material embedded in plastic and secured integrally with the wall of the pipe. The magnetic particles are of iron oxide or barium ferrite and of a size, shape, distribution and proportion such that the plastic pipe may be easily detected by a magnetic detection apparatus on the surface when the plastic pipe is buried at a selected depth e.g., 3-5 feet, more or less, under the ground.

The magnetic particles may be uniformly distributed throughout the thickness and uniformly distributed around the entire circumference of the plastic pipe or may be distributed in discrete portions of the plastic pipe, as for example, a uniform outer layer of the pipe or in stripes or strips extending along the pipe. The particles may be extruded with the plastic in forming the pipe, whether uniformly dispersed or in discrete regions or the pipe may be formed of plastic free of the magnetic particles and the magnetic particles provided in a separately applied strip which may be coextruded or fused or adhered to the wall of the pipe. The magnetic strips or magnetic portions of the plastic pipe may have selective areas or portions magnetized to encode information readable from the surface of the ground above the buried pipe or otherwise at a distance from the pipe.

EXTRUSION OF PIPE WITH EMBEDDED MAGNETIC PARTICLES

Figure 1:
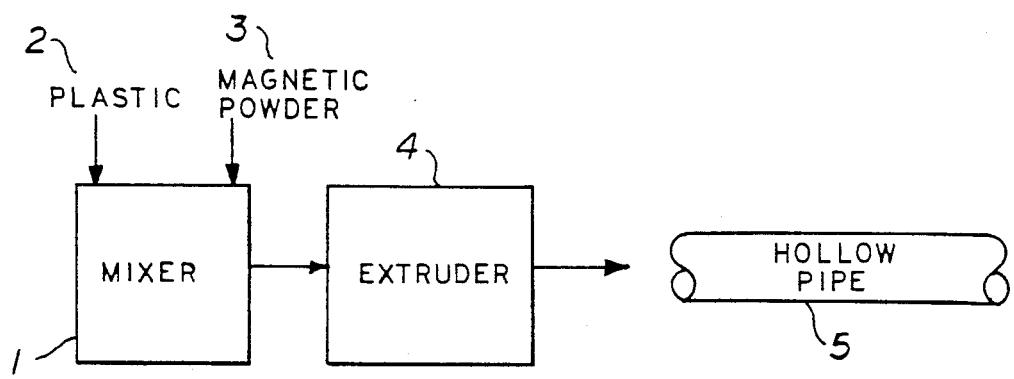
FIG. 1 is a flow diagram of the extrusion or coextrusion of plastic pipe containing particles of magnetic material therein.

Referring to the drawings, FIGS. 1-5 show a schematic or block diagram for extruding pipe and various sectional views of extruded plastic pipe with embedded magnetic particles. In FIG. 1, a mixer receives a supply of extrudable plastic 2, usually powder or pellets, and a supply of magnetic particles 3. The mixer is a conventional plastics extrusion mixer of the type for blending dyes or pigments or fillers prior to extrusion. The plastic used is polyethylene, although polyvinyl or other moldable or extrudable organic resin polymers are satisfactory if the molded or extruded pipe has satisfactory strength. The magnetic particles are preferably needle-like particles or platelets of iron oxide or barium ferrite which will magnetize readily and hold magnetism substantially permanently.

The mixture of molten plastic and magnetic particles is fed from mixer 1 to a plastics extruder 4 where it is extruded into a hollow tubular pipe with the magnetic particles distributed according the type of extrusion die used. Extrusion dies are commercially available or described in patents or technical literature in a variety of forms.

One such die is a single extrusion die for extruding a plastic without any filler or for extruding a plastic admixed uniformly with a filler, in this case magnetic particles. Another extrusion die has concentric extrusion for extruding one material over another to produce a composite product having outer and inner portions of different composition or for laying down a thin coating over a main extrusion product.

Still another extrusion die is one which has segmented outlets for extruding separate streams of plastic of different compositions. This type of die is used in extruding tubular films or flexible or rigid tubing with stripes by alternating streams of unpigmented plastic with streams of pigmented plastic. Information of these dies is readily available in the patent literature and in various texts and technical articles on plastics engineering, as well as in various manufacturer's literature.

Figure 2:
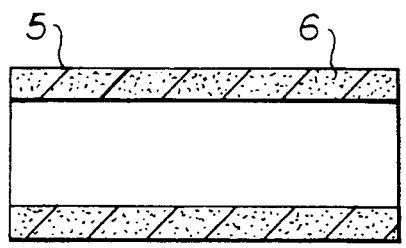
FIG. 2 is a longitudinal section of an extruded plastic pipe containing particles of magnetic material dispersed uniformly in the wall thereof.
Figure 3:
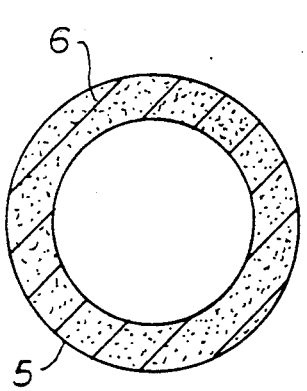
FIG. 3 is a lateral section of an extruded plastic pipe containing particles of magnetic material dispersed uniformly in the wall thereof.
Figure 4:
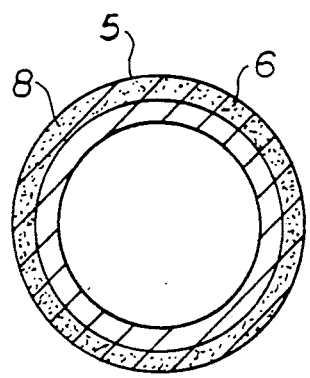
FIG. 4 is a lateral section of an extruded plastic pipe containing particles of magnetic material dispersed in the outer section of the wall thereof.
Figure 5:
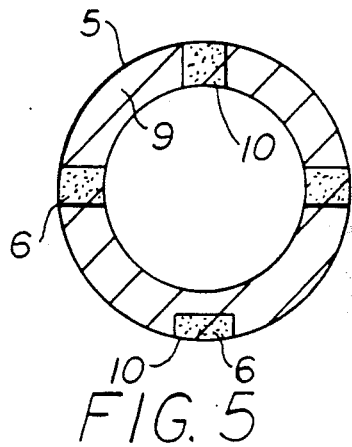
FIG. 5 is a lateral section of an extruded plastic pipe containing particles of magnetic material dispersed uniformly in strips of the wall thereof.

The pipe 5, shown schematically in FIG. 1, may have magnetic particles 6 uniformly distributed through the wall of the pipe as seen in FIGS. 2 and 3. In FIG. 4, the pipe 5 is extruded from a concentric die for producing a two (or more) layered pipe. In this embodiment, the pipe 5 may have an inner portion 7 which is unpigmented plastic and an outer layer 8 containing the magnetic particles 6. The layers 7 and 8 may be of nearly equal thickness, e.g., 0.125" each, or the inner layer 7 may be the main thickness of the pipe wall, e.g., 0.250", and the outer layer 8 a thin layer or coating of a thickness of the order of about 0.025". The pipe 5 shown in FIG. 5 is from a split die extruding alternate streams of unpigmented plastic and of plastic containing magnetic particles. This pipe has regions 9 of unpigmented plastic and regions 10 of plastic containing magnetic particles 6. In this embodiment, the magnetic-particle-containing regions 10 are preferably stripes running longitudinally of the pipe. The embodiments of FIGS. 4 and 5 may be combined, if desired, so that the stripes 10 do not extend through the entire thickness of the pipe 5 but are recessed in the surface, e.g., strip 10a in FIG. 5.

The pipes 5, in any of the several embodiments, are magnetized by exposure to a high-power magnet to magnetize the magnetic particles 6. This magnetization may be done before, during or after the extrusion of the pipe 5. Magnetizing the particles 6 prior to extrusion is not preferred because the magnetized particles tend to adhere to each other and are difficult to disperse. Magnetization during extrusion, after magnetic particles 6 have been dispersed, or after extrusion, after the plastic has hardened, is preferred. The amount of magnetic material in the pipe is sufficient to produce the desired amount of magnetism to detect the pipe at a depth of 3-5' or more. A concentration of 8% of magnetic particles, e.g., iron oxide or barium ferrite, dispersed uniformly in a 3" plastic pipe having a 0.230" wall is sufficient for detection of the pipe at a depth of 3'. The amount and/or concentration of the magnetic particles in the plastic pipe is varied, in practice, according to the size and wall thickness of the plastic pipe. Also, in embodiments such as those of FIGS. 4 and 5, the concentration of the magnetic particles is higher so that there is enough magnetic material present to produce the desired magnetic effect. In such a case, an experimental determination is made initially of the effect of loading the plastic with magnetic particles on tensile strength and the product designed to balance needed tensile properties with the amount of magnetic material required in the pipe.

APPLICATION OF MAGNETIC PARTICLE CONTAINING STRIPS TO PIPE

In the embodiment of FIGS. 6-8, particles of a magnetic material such as iron oxide or barium ferrite are suspended in a polyethylene, or other organic polymer, matrix at a higher concentration and then formed or extruded as a tape. This tape is then affixed to the pipe. Alternatively, the tape may be coextruded with the pipe.

Magnetic products of this composite type currently exist in a number of applications. For example, an iron oxide-loaded PVC product, manufactured by Leon Plastics, is used as a high density plastic feedstock in injection molding applications where "heavy" plastic parts are required. (PVC and polyethylene plastics have a density of 1 g/cc.)

A second magnetic composite is a flexible magnetic rubber strip product manufactured by 3M Corporation. This product is used to make magnetic signs and emblems for use on automobiles and refrigerator doors. Instead of iron oxide, however, the magnetism is provided by barium ferrite, which is magnetically similar to iron oxides in remanent magnetization but has higher coercivities.

Other products are manufactured both by 3M and other companies, in which magnetic particles are mixed with either polypropylene or nylon and injection molded to form, for example, stator parts for motors or wheels to be used in counters.

To determine the concentrations of magnetic material needed to mix with polyethylene, experiments were first performed with high concentrations of magnetic material, concentrations suitable for the application of magnetic strips to the sides of the pipe. These runs were made with a small commercial mixing machine (Braybender Corp.). Polyethylene "fluff" mixed with various amounts of different types of magnetic particles were heated and mixed in the Braybender and then pressed with several tons of force into small strip molds. Ratios (by weight) of up to 2.3/1 barium ferrite/polyethylene and up to 1.6/1 gamma iron oxide/polyethylene were tested.

The resultant magnetic plastic composites indicate that the physical properties of the polyethylene are not prohibitively affected by the addition of the magnetic oxides. Tensile strength did not differ significantly from pure polyethylene, although elongation strength was considerably lessened.

The samples were magnetized and measured; both types of magnetic oxide exhibited magnetizations of about 40 emu/cc. The two magnetic oxides differed significantly in terms of the resultant direction of magnetization; barium ferrite would only magnetize across the flat dimension, i.e., thickness, of the strips, while iron oxide magnetized only in the plane, i.e., across the width, of the strip. This difference is attributed to the difference in shape of the magnetic particles. The barium ferrite is small platelets whose easy direction of magnetization is across the thickness of the plate, while the gamma iron oxide is long needles whose easy direction of magnetization is along the length of the needle.

Calculations were performed to determine the magnetic moment that would arise from adhering these magnetic strips to 2 inch diameter plastic pipe. As an example, a 3 foot length of pipe with four strips (0.75 inch wide by 0.025 inch thick) would have a total magnetization of 1760 emu (FIGS. 6-8). At a distance of three feet, the pipe exhibits a magnetic field of 230 gammas (1 gamma=10-5 Gauss; earth's magnetic field about 50,000 gammas). Since pipe sections are nearly always longer than 3 feet, larger magnetic signals are to be expected, since the pipe beyond the 3 foot length of the example will also contribute to the magnetic signal.

The extrusion process causes the magnetic particles to be aligned during forming. Further alignment is achieved by applying magnetic fields during these formation processes. This significantly increases the resultant magnetization, by as much as nearly a factor of 2. The literature indicates that a different carrier will allow much greater concentrations of magnetic material and hence, much higher remanences, up to 350 emu/cc, to be achieved. This means that it is possible to achieve detection field strengths of 1000 gammas or more (as compared to the 230 gammas of the experiment).

In the development of the embodiments of FIGS. 1-5, the extrusion of a magnetically doped polyethylene was investigated. Initially weight ratios of 1.6:1 of magnetic oxide to polyethylene were used, both for barium ferrite and iron oxide. This proved to be too much, as viscosity was too large for the small extruder being utilized. The ratio was reduced to 0.5:1 and several hundred feet of tape (6" wide and 0.025" thick) of each composition was produced. Measurement of the magnetic moment indicated 12 emu/cc for both magnetic oxides, a value roughly consistent with the concentration of magnetic material used.

Four of these strips 11 containing magnetic particles 12 each were adhered to 3 foot sections of five different pipe 13 diameters ranging from 1.3 to 4.5 inches (again in the configuration shown in FIG. 6-8). These produced magnetic signatures at a 3 foot distance, of 20 gammas for the smallest pipe to 95 gammas for the largest. All measured values agreed perfectly with values calculated for each pipe diameter. This means that the model being used to calculate the magnetic signatures is realistic. The process has been described with reference to plastic but other organic polymers, including rubber, could be used.

The smaller concentration of magnetic material in the extruded polyethylene pipe bears on the process of adding the magnetic material directly to the polyethylene used to make the pipe. Since the pipe wall volume is much larger than the volume of the tapes discussed above, greater amounts of magnetic material will be present, giving rise to larger signals than the extruded tape gave. Lower concentrations alters the physical properties of the polyethylene to a significantly lesser extent than found in the strip-molded material.

Several conclusions can be made at this point. 1) Heavily loaded magnetic tapes can be used to magnetically "see" plastic pipe at depths of three to five feet and greater. 2) Addition of iron oxides to the polyethylene formulation used to make standard plastic gas pipe does not drastically alter the physical properties of this polyethylene, hence makes practical a process of making the plastic pipe itself magnetic. 3) Choice of iron oxides with the shape of the particles in mind allows much higher magnetizations to be achieved. This is due to alignments, variously different according to the process, induced by the forming process.

Finally, the cost of producing a magnetic pipe product will have an important effect on its ultimate acceptance. Ideally the cost should be a small part of the overall pipe manufacturing cost. The data developed in connection with this process indicate that the process and resulting product are commercially feasible.

ENCODING OF DATA IN PIPE

The magnetic strips or magnetic portions of the plastic pipe may have selective areas or portions magnetized to encode information readable from the surface of the ground above the buried pipe or otherwise at a distance from the pipe, as in inventorying, etc. The pipe, whether formed with uniformly spaced magnetic particles or with stripes of magnetic particles in the wall of the pipe, or in separately formed or separately applied strips of plastic containing magnetic particles, may be selectively magnetized, i.e., in different areas or regions, or may be magnetized to selected levels of magnetism. In practical use. the pipe with magnetic stripes or strips on or in the pipe wall is selectively magnetized in the manner of magnetic bar codes to encode information which can be read from the surface of the ground when the pipe is buried. Such information may include such data as the manufacturer, type of pipe, installer, time of installation, etc.

While this invention has been described fully and completely with emphasis on several preferred embodiments, it should be understood that, within the scope of the appended claims, the invention may be practiced otherwise than as specifically described.

I claim:

1. A magnetically detectable plastic pipe for underground use, comprising:

hollow tubular plastic pipe having particles of electrically-nonconductive, highly-magnetized iron oxide or barium ferrite embedded in plastic and secured integrally with the wall of said pipe, said magnetized particles being of a size, shape, distribution and proportion such that the plastic pipe may be easily detected by magnetic detection apparatus on the surface when the plastic pipe is buried at three to five feet or more under the ground.

2. A magnetically detectable plastic pipe according to claim 1 in which, said highly magnetized particles are uniformly distributed throughout the thickness of the wall of said plastic pipe in a concentration which does not substantially decrease the tensile strength of the pipe.

3. A magnetically detectable plastic pipe according to claim 1 in which, said highly magnetized particles are uniformly distributed in the wall of said plastic pipes around the entire circumference thereof in a concentration which does not substantially decrease the tensile strength of the pipes.

4. A magnetically detectable plastic pipe according to claim 1 in which, said highly magnetized particles are uniformly distributed through the thickness of the wall of said plastic pipe in a concentration which does not substantially decrease the tensile strength of the pipe, and uniformly distributed around the entire circumference of said plastic pipe.

5. A magnetically detectable plastic pipe according to claim 1 in which, said highly magnetized particles are uniformly distributed throughout the thickness of the wall of said plastic pipe in discrete portions of the plastic pipe in a concentration which does not substantially decrease the tensile strength of the pipe.

6. A magnetically detectable plastic pipe according to claim 5 in which, said discrete portions of the plastic pipe comprise stripes of material containing said highly magnetized particles extending longitudinally of the plastic pipe.

7. A magnetically detectable plastic pipe according to claim 1 in which, said highly magnetized particles are embedded in a strip of plastic material secured on the surface of the wall of said plastic pipe.

8. A magnetically detectable plastic pipe according to claim 7 in which, said strip of highly-magnetized particle-carrying plastic material is pre-formed and adhered to the surface of the wall of said plastic pipe.

9. A magnetically detectable plastic pipe according to claim 7 in which, said strip of highly-magnetized particle-carrying plastic material is extruded and fused to the surface of the wall of said plastic pipe.

10. A magnetically detectable plastic pipe according to claim 7 in which,
said strip of highly-magnetized particle-carrying plastic material is coextruded with said plastic pipe.

11. A magnetically detectable plastic pipe according to claim 7 in which,
said strip of highly-magnetized particle-carrying plastic material is coextruded to a selected depth in the wall of said plastic pipe.

12. A magnetically detectable plastic pipe according to claim 1 in which,
said electrically-nonconductive, highly-magnetized particles are magnetized prior to embedding in said plastic.

13. A magnetically detectable plastic pipe according to claim 1 in which,
said electrically-nonconductive, highly-magnetized particles are magnetized during embedding in said plastic.

14. A magnetically detectable plastic pipe according to claim 1 in which,
said electrically-nonconductive, highly-magnetized particles are magnetized after embedding in said plastic.

15. A magnetically detectable plastic pipe according to claim 1 in which,
said plastic is an organic, extrudable or moldable resin.

16. A magnetically detectable plastic pipe according to claim 15 in which,
said plastic is a polyethylene or polyvinyl resin.

17. A magnetically detectable plastic pipe according to claim 7 in which,
said electrically-nonconductive, highly-magnetized particles are present in said strip in a concentration sufficient to be easily detected by magnetic detection apparatus on the surface when the plastic pipe is buried at a selected depth under the ground and high enough to substantially reduce the tensile strength of said pipe if incorporated in the wall of said pipe at that concentration.

18. A magnetically detectable plastic pipe according to claim 9 in which,
said electrically-nonconductive, highly-magnetized particles are present in said strip in a concentration sufficient to be easily detected by magnetic detection apparatus on the surface when the plastic pipe is buried at a selected depth under the ground and high enough to substantially reduce the tensile strength of said pipe if incorporated in the wall of said pipe at that concentration.

19. A magnetically detectable plastic pipe according to claim 10 in which,
said electrically-nonconductive, highly-magnetized particles are present in said strip in a concentration sufficient to be easily detected by magnetic detection apparatus on the surface when the plastic pipe is buried at a selected depth under the ground and high enough to substantially reduce the tensile strength of said pipe if incorporated uniformly in the wall of said pipe at that concentration.

* * * * *